United States Patent Office 2,956,077
Patented Oct. 11, 1960

2,956,077
ESTER OF METHYLENECYCLOPROPANE-
CARBOXYLIC ACID

John A. Carbon, William B. Martin, and Leo E. Swett, Waukegan, Ill., assignors to Abbott Laboratories, North Chicago, Ill., a corporation of Illinois No Drawing. Filed July 7, 1958, Ser. No. 746,638

1 Claim. (Cl. 260—468)

This invention relates to novel compounds and a process for their preparation. The compounds prepared by the process hereafter disclosed are loweralkyl methylenecyclopropanecarboxylates which are structurally presented as:

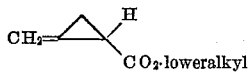

These compounds are useful as chemical intercediates in the preparation of a compound which is orally effective as a hypoglycemic agent; that is, a compound which reduces blood sugar.

The compounds of this invention are prepared from loweralkyl 2-halo-2-methylcyclopropanecarboxylates by refluxing said compounds with a metal hydride. The loweralkyl 2-halo-2-methylcyclopropanecarboxylates are prepared by reacting a halopropene with a loweralkyl diazoacetate as disclosed more fully in co-pending application, Serial No. 746,635 filed of even date herewith. The carboxylate compounds of this invention can be reduced to the corresponding alcohol form according to co-pending application, Serial No. 746,636, filed of even date herewith and now U.S. Patent 2,921,966, and then treated with a p-substituted benzenesulfonyl halide to form methylene cyclopropanemethyl p-substituted benzenesulfonate, as disclosed in co-pending application Serial No. 746,600, filed of even date herewith. Thereafter, the benzenesulfonate is condensed with diloweralkyl formamidomalonate to form a diloweralkyl formamido-(methylenecyclopropanemethyl)malonate. The active hypoglycemic agent is prepared by hydrolysis and decarboxylation of the said resulting malonate as disclosed in greater detail in co-pending application, Serial No. 746,637, filed of even date herewith. This compound is α-amino-methylenecyclopropanepropionic acid, also known as hypoglycin A.

Hypoglycin A is one of the components extracted from the fruit Blighia sapida. This fruit is commonly known as Ackee. A second hypoglycemic component present in said fruit is known as hypoglycin B. Hypoglycin A has been widely investigated regarding its pharmacological and chemical properties. Physical and chemical constants of hypoglycin A and its hypoglycemic activity have been described by C. H. Hassall and K. Reyle in "Biochem. Journ.," volume 60, page 324 (1955), and "Nature," volume 173, page 356 (1954). The chemical structure of hypoglycin A was definitely established by C. V. Holt and W. Leppla in "Angewandte Chemie," volume 70, page 25 (1958).

The following example is presented as an embodiment of the process which produces the novel compound. It is not intended that said example be construed as an exclusive illustration.

EXAMPLE

Ethyl methylenecyclopropanecarboxylate

Ethyl 2-bromo-2-methylcyclopropanecarboxylate (76.7 gms.; 0.37 mole) is added to a mixture of 10.6 gms. (0.44 mole) of sodium hydride and 350 ml. of dry ether. The mixture is stirred under reflux and the reaction is initiated by adding about ten drops of absolute ethanol. The refluxing and stirring is continued for seven hours, during which time a few drops of ethanol are added every two hours. The reaction is allowed to continue at room temperature for 72 hours. Excess sodium hydride is destroyed by adding 200 ml. of water and cooling in an ice-bath. The ether layer is separated and the aqueous layer is extracted with two small portions of ether. After drying over anhydrous magnesium sulfate, the combined extracts are distilled through a small fractionating column. Ethyl methylenecyclopropanecarboxylate is obtained as a colorless oil in a yield of 21.5 gms. (46.1%), B.P. 152–154° C., and $n_D^{25}$ 1.4447.

Analysis.—Calcd. for $C_7H_{10}O_2$. Calculated: C, 66.64%; H, 7.99%; O, 25.37%. Found: C, 66.68%; H, 8.11%; O, 25.45%.

Others may practice the invention in any of the numerous ways which will be suggested by this disclosure to one skilled in the art. All such practice of the invention is considered to be a part hereof provided it falls within the scope of the appended claim.

We claim:
Ethyl methylenecyclopropanecarboxylate

References Cited in the file of this patent

Hickinbottom: "Reactions of Organic Compounds," pages 397–8 (1948).
Crombie et al.: J. Chem. Soc., 2744 (1957).

UNITED STATES PATENT OFFICE

CERTIFICATION OF CORRECTION

Patent No. 2,956,077                                               October 11, 1960

John A. Carbon et al.

It is hereby certified that error appears in the above numbered patent requiring correction and that the said Letters Patent should read as corrected below.

In the grant, lines 1 and 2, and in the heading to the printed specification, line 4, for "Leo E. Swett", each occurrence, read -- Leo R. Swett --.

Signed and sealed this 2nd day of May 1961.

(SEAL)
Attest:

ERNEST W. SWIDER                                        DAVID L. LADD
Attesting Officer                                          Commissioner of Patents